Patented Feb. 16, 1932

1,845,815

UNITED STATES PATENT OFFICE

ROBERT N. RIDDLE, OF GERMANTOWN, PENNSYLVANIA, ASSIGNOR TO RIDDLE PROCESS COMPANY, OF PHILADELPHIA, PENNSYLVANIA, A CORPORATION OF NEW YORK

DECOLORIZING CARBON AND PROCESS OF MAKING SAME

No Drawing.    Application filed February 7, 1927.   Serial No. 166,609.

This invention relates primarily to the production of a form of carbon which will serve as an efficient decolorizing agent, though also useful for some other purposes. In certain modifications of the process of producing such form of carbon, sometimes called activated carbon, sundry more or less valuable by-products may also be obtained.

The invention affords a novel activated carbon, as well as a novel process and novel steps of operations of manufacture.

In producing my novel carbon from forms of carbon such as coal, I employ another material of the character hereinafter indicated, with which I associate the particles of coal in a pulverized state of fine division, in such wise that the coal particles are invested, coated or embedded in the other material. I heat the thus prepared fine coal sufficiently to liberate much or all of its volatile matter, and even subject it to a temperature and conditions to cause some combustion of its carbon, all, however, without permitting free and total combustion and consumption of the carbon, and without sintering or coking together the original fine carbonaceous particles, such sintering or coalescence being prevented by the presence or action of the other material, as well as free or rapid combustion of the coal. After the heating operations are completed, the carbon product may be freed of the other material or its residue.

As the "other material" in my process as above outlined, I make use of a substance such as sodium carbonate, which affords the coal particles an investure sufficiently refractory not to burn away, fuse, or coalesce at the temperatures required in my process to distill away those hydrocarbons which might fuse and cement the particles together; does not chemically alter the fixed carbon of the coal; and is inexpensive. But many other materials are known which possess similar properties in greater or less degree, and may be used for the purposes of my invention: especially the various alkali metal salts and compounds, and the alkali metal carbonates in particular, though I believe that few such substances are so cheap as sodium carbonate.

As an example of the preferred method for carrying out my process I may proceed as follows: I form an aqueous mixture of pulverized soft coal and sodium carbonate in the proportions by weight of two parts of coal to one of the carbonate. Commercial soft coal of any good quality may be used; but I prefer the kind known as high volatile, and this should be pulverized to a fineness of 200 mesh, as is commonly done in preparation for use in commercial pulverized fuel burning plants. The sodium carbonate is preferably used in the form of a commercial saturated solution of sal soda

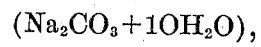

$(Na_2CO_3 + 10H_2O)$, maintained at a temperature of from 37 degrees to 45 degrees centigrade. A temperature higher than 45 degrees affects injuriously the subsequent crystallization of the mixture. The quantity should be such that the sodium carbonate content of the mixture will be one-half the weight of the coal. This mixture is vigorously stirred immediately upon its formation and continuously thereafter until crystallization accompanied by the evolution of heat is completed. This is evidenced by the cooling of the mass, usually occurring in about a half hour's time. The material is then dry enough to sift, and after sifting is allowed to stand in a warm room for about 15 hours to further dry out the remaining moisture. The temperature in this drying step should not be above 34 degrees centigrade, the fusing point of the sodium carbonate crystals. However, any water remaining in the mass is dried out in the earlier stages of the subsequent heating.

The dried mass of fine powder is then put in an open vessel over a fire, or otherwise heated slowly in the presence of air, so that in about 15 minutes its temperature will rise to approximately 240 degrees centigrade, at which point fumes begin to escape from the carbon. Throughout the whole operation the mass is vigorously stirred. The applied heat may then be discontinued, but the temperature will go on rising, due to exothermic reactions, and the evolution of fumes also continues, until, at about 360 degrees centigrade, some of the carbon of the mass ignites and burns slowly with a soft glow. This usually occurs in about 20 minutes after the applied heat has been withdrawn. The stirring is continued vigorously for about 30 minutes, distributing the glowing carbon throughout the mass. Then the glowing of the carbon will have ceased (due to breaking up of the glowing masses by the stirrer), and the mass will have cooled to a temperature at which ignition will not recur. If the mass is not thus stirred, the glowing will continue until practically all of the carbon of the mixture is consumed. Notwithstanding the stirring, the access of air to the carbonaceous particles is limited by the closeness of the particles in the mass, as well as by their investure of sodium carbonate. I believe that during this glowing step an active reaction occurs (automatically accelerated perhaps by the heat generated thereby) in which the tarry matter of the unburned coal distills out. Throughout and after this heating step or operation, the material remains a fine powder, and there is no fusion, sintering or coking together of the fine carbonaceous particles.

There seem to be two distinct successive stages in this heating step, the first one characterized by loss of weight with the liberation of copious non-inflammable fumes, resulting in the elimination of about 50% of the volatile hydrocarbons of the coal, and the second characterized by continued loss of weight but without the liberation of visible fumes, though nearly all of the remaining volatile hydrocarbons are then apparently driven off. The product of this step can be raised to a red heat and above without giving off tarry or smoky fumes. If it be washed to remove the sodium content, the remaining carbon will be found to possess effective decolorizing qualities, though not so effective as those developed in the product of the hereinafter described later steps of my complete process.

If the process is to be continued to produce the more efficient decolorizing agent, the cooled mixture above described is charged (unwashed) into a retort and heated to about 1000 degrees centigrade for about one hour. By this treatment other volatilizable impurities are driven off (but without coking), and when evolution of gas ceases the temperature is lowered to about 450 degrees centigrade and steam is passed through the mass in the retort for about one hour in such a manner as to thoroughly impregnate it. The mass is so porous that a pressure equivalent to only a few inches of water will force the steam, or any gas, downward through a body of at least 12 to 16 inches in thickness. The escaping steam carries off a quantity of ammonia, representing about 90% of the natural combined nitrogen of the coal, which can be recovered in any one of several well-known ways to obtain a valuable by-product. In this operation, also, the bulk of the sulphur in the coal combines with the hydrogen resulting from the dissociation of the steam, or otherwise, and is carried off. The entire operation therefore leaves only pure, fixed carbon, as the hydrocarbons and carbon complexes have been removed in this or in the glowing step. Throughout and after this step or operation, the material remains a fine powder, without sintering or coking together of the fine carbon particles.

When the ammonia is all removed the residue in the retort is withdrawn and washed with water to remove the sotdium carbonate, which can be used over again if desired. To remove every trace of the carbonate as well as of acids, soluble silica, iron, aluminum or other impurities, I also wash the residue with dilute hydrochloric acid (HCl), and then again in water.

The washed carbon represents about 50% of the fixed carbon content of the original coal. It is highly porous and therefore highly efficient as a filtering agent, and is a decolorizing agent of great efficiency. It may be used immediately for these purposes without further treatment. If it is to be stored for future use or shipment it should be first dried. When mixed with sugar syrup, for instance, for decolorizing purposes, and subsequently filtered out, it does not clog the filter bed with any such slimy layer as soon collects when other carbon decolorizing agents are used, unless, that is, they have been mixed with infusorial earth or some such porous material. On the contrary, the layer of my material so deposited merely becomes an active element of the filter. Consequently the labor of adding and removing the infusorial earth heretofore required is saved and the rapidity of the filtering operation increased.

Another valuable property of the product of my invention is its clarifying power when used as a filter for syrups and other solutions. By clarification is meant the removal of all suspended impurities, whether or not they have a coloring effect, and this is accomplished without unduly clogging the filter bed. It is well known that certain constituent impurities are not removed from solutions by ordinary filtering material, and that other impurities, which render a solution cloudy, such as albumenoids, will, if collected by the filter bed, soon clog it up and so combine with it that the filtering material can only be revivified by heating, or by other costly treatment. The activated carbon produced by my process, however, will remove all impurities that tend to prevent filtering. At least this removal occurs to an extent never before attained, so far as known to me. This renders the filtered liquid crystal clear and the carbon will retain its efficiency during a considerable period of use and, when a filter bed formed of it has finally become clogged, it can be restored to full efficiency by simply washing with water, and dilute acid, though, of course, this can also be done by heating, as is customary with bone black, if desired. In fact efficiency of such carbon increases after repeated periods of use, with intervening washings.

These properties I attribute largely to the extremely fine state of division to which the final product, the carbon, has been reduced.

In the first place, the coal, or other natural form of fixed carbon, used as raw material is generally pulverized to 200 mesh, as above described, or to even a greater degree of fineness. I have found that the efficiency of the product increases with the degree of fineness. Thus, if the floating dust created by the grinding to 200 mesh is collected and used as the raw material for my process, a still more efficient clarifying and decolorizing carbon results. On the other hand, if even the best quality of soft coal is ground only to 100 mesh and used in the process, the resultant product is of a low efficiency.

Having described my invention, I claim:

1. A process for preparing finely divided clarifying and decolorizing carbon whose particles have a highly porous structure, which process comprises heating pulverized coal having its particles invested with refractory material which will not chemically alter the fixed carbon of the coal at the temperatures employed in the process, and subjecting the particles to a temperature of redness, with prevention of fusion and sintering together of the carbonaceous particles by their refractory investure, and afterward removing the residue of the refractory material from the unsintered particles of fixed carbon of the coal.

2. A process for preparing finely divided clarifying and decolorizing carbon whose particles have a highly porous structure, which process comprises heating pulverized coal having its particles invested with refractory material which will not chemically alter the fixed carbon of the coal at the temperatures employed in the process and subjecting the thus prepared coal to a temperature of redness, with prevention of fusion and sintering together of the carbonaceous particles by their refractory investure, and also subjecting the particles to partial combustion.

3. A process for preparing finely divided clarifying and decolorizing carbon whose particles have a highly porous structure, which process comprises heating pulverized coal having its particles invested with a soluble refractory alkali metal compound which will not chemically alter the fixed carbon of the coal at the temperatures employed in the process and subjecting the thus prepared coal to a temperature of redness, with prevention of fusion and sintering together of the carbonaceous particles by their refractory investure, and also subjecting the particles to partial combustion; and dissolving away the residue of the compound from the unsintered carbonaceous particles.

4. A process for preparing finely divided clarifying and decolorizing carbon whose particles have a highly porous structure, which process comprises heating pulverized coal having its particles invested with refractory material which will not chemically alter the fixed carbon of the coal at the temperatures employed in the process and subjecting the thus prepared coal to a temperature of redness, with prevention of fusion and sintering together of the carbonaceous particles by their refractory investure, and heating at red heat until evolution of gas substantially ceases and subjecting the product to the action of steam.

5. A process for preparing finely divided clarifying and decolorizing carbon whose particles have a highly porous structure, which process comprises heating pulverized coal having its particles invested with a soluble refractory alkali metal compound which will not chemically alter the fixed carbon of the coal at the temperatures employed in the process and subjecting the thus prepared coal to a temperature of redness, with prevention of fusion and sintering together of the carbonaceous particles by their refractory investure, and heating at red heat until evolution of gas substantially ceases and subjecting the product to the action of steam; and dissolving away the residue of the compound from the unsintered carbonaceous particles.

6. A process for preparing finely divided clarifying and decolorizing carbon whose particles have a highly porous structure, which process comprises heating pulverized coal having its particles invested with refractory material which will not chemically alter the fixed carbon of the coal at the temperatures employed in the process; first heating for some time at moderate temperatures below redness, afterward subjecting the thus prepared coal to a temperature of redness, with prevention of fusion and sintering together of the carbonaceous particles by their refractory investure, and subsequently subjecting the product to the action of steam at temperatures between those of the first and second temperature stages aforementioned; and thereafter removing the residue of the refractory material from the unsintered particles of carbon of the coal.

ROBERT N. RIDDLE.